(12) United States Patent
Jun

(10) Patent No.: US 8,144,416 B2
(45) Date of Patent: Mar. 27, 2012

(54) HARD DISK DRIVING CIRCUIT AND METHOD OF DRIVING SPINDLE MOTOR

(75) Inventor: Walter Jun, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/762,403

(22) Filed: Apr. 19, 2010

(65) Prior Publication Data

US 2010/0309575 A1 Dec. 9, 2010

(30) Foreign Application Priority Data

Jun. 8, 2009 (KR) ........................ 10-2009-0050525

(51) Int. Cl.
*G11B 17/00* (2006.01)
*H02P 25/08* (2006.01)

(52) U.S. Cl. ...................................... 360/71; 318/254.1

(58) Field of Classification Search .......................... None
See application file for complete search history.

(56) References Cited

U.S. PATENT DOCUMENTS

| 5,221,881 A * | 6/1993 | Cameron | 318/400.35 |
| 5,552,685 A * | 9/1996 | Young et al. | 318/400.32 |
| 6,631,045 B1 * | 10/2003 | Pedrazzini | 360/75 |

FOREIGN PATENT DOCUMENTS

| JP | 05-325389 | 12/1993 |
| JP | 2005-259253 | 9/2005 |
| KR | 20080004658 | 1/2008 |

* cited by examiner

*Primary Examiner* — K. Wong
(74) *Attorney, Agent, or Firm* — Stanzione & Kim, LLP

(57) ABSTRACT

A hard disk driving circuit for reducing a maximum amount of current for driving a spindle motor, and a method of driving the spindle motor. The hard disk driving circuit include spindle motor, a spindle motor driving circuit driving the spindle motor, a control circuit controlling the spindle motor driving circuit, and a plurality of functional blocks related to driving a hard disk, and further includes a mask clock signal generator generating a mask clock signal that is inactivated for a period of time when the spindle motor is driven, by using the clock signal. At least one selected from the group consisting of the control circuit, the spindle motor driving circuit, and the plurality of functional blocks operates according to the mask clock signal.

20 Claims, 5 Drawing Sheets

HARD DISK DRIVING CIRCUIT AND METHOD OF DRIVING SPINDLE MOTOR

CROSS-REFERENCE TO RELATED APPLICATIONS

This application claims priority under 35 U.S.C. §119(a) of Korean Patent Application No. 10-2009-0050525, filed on Jun. 8, 2009, in the Korean Intellectual Property Office, the disclosure of which is incorporated herein in its entirety by reference.

BACKGROUND

1. Field of the Invention

The inventive concept relates to a hard disk driving circuit, and more particularly, to a hard disk driving circuit that reduces the maximum amount of current when a spindle motor is driven.

2. Description of the Related Art

Hard disk drives can be installed in desktop computers, notebook computers, or mobile devices. Recently, hard disk drives have been increasingly installed in notebook computers or mobile devices. A hard disk is rotated by a spindle motor. In order to obtain a normal rotation number of the spindle motor, a predetermined power needs to be supplied to the spindle motor.

When power is not uniformly supplied to a device in which a hard disk is installed, in particular, if the rotation number of a second or a minute of a spindle motor does not reach a predetermined number when the hard disk is initially driven just after power is supplied, the presence of the hard disk cannot be read.

Thus, there is a need for a method and device for rotating a spindle motor at a predetermined rotation number even if a lower current is supplied to the spindle motor due to non uniform supply of power.

SUMMARY

Example embodiments of the present general inventive concept provide a hard disk driving circuit that reduces the maximum current amount when a spindle motor is driven.

Additional features and utilities of the present general inventive concept will be set forth in part in the description which follows and, in part, will be obvious from the description, or may be learned by practice of the general inventive concept.

The present general inventive concept also provides a spindle motor driving method that reduces the maximum current amount when a spindle motor is driven.

The foregoing and/or other features and utilities of the present general inventive concept may be achieved by providing a hard disk driving circuit including a spindle motor; a spindle motor driving circuit driving the spindle motor, a control circuit controlling the spindle motor driving circuit, a plurality of functional blocks related to driving a hard disk, and a mask clock signal generator generating a mask clock signal that is inactivated for a period of time when the spindle motor is driven, by using the clock signal. At least one selected from the group consisting of the control circuit, the spindle motor driving circuit, and the plurality of functional blocks may operate according to the mask clock signal.

The foregoing and/or other features and utilities of the present general inventive concept may also be achieved by providing a method of driving a spindle motor of a hard disk driving circuit including a spindle motor, a spindle motor driving circuit driving the spindle motor, a control circuit controlling the spindle motor driving circuit, and a plurality of functional blocks related to driving a hard disk, the method including inactivating a mask clock signal, driving the spindle motor, and activating the mask clock signal, wherein at least one selected from the group consisting of the control circuit, the spindle motor driving circuit, and the plurality of functional blocks operates in response to the mask clock signal.

The foregoing and/or other features and utilities of the present general inventive concept may also be achieved by providing a method of driving a spindle motor of a hard disk driving circuit including a spindle motor, a spindle motor driving circuit driving the spindle motor, a control circuit controlling the spindle motor driving circuit, and a plurality of functional blocks related to driving a hard disk, the method including prior to driving the spindle motor, inactivating functional blocks except for functional blocks used to drive the spindle motor.

The foregoing and/or other features and utilities of the present general inventive concept may also be achieved by providing a method of driving a hard disk drive, the method including de-activating a clock signal used by a controller, starting a spindle motor controlled by the controller to drive a disk, and upon full rotation of the spindle motor, re-activating the clock signal, where the clock signal is de-activated for a predetermined time by a mask clock signal.

The foregoing and/or other features and utilities of the present general inventive concept may also be achieved by providing a hard disk drive including a spindle motor to drive a hard disk, a mask clock signal generator to generate a mask clock signal, and a controller to control a current to the spindle motor, the controller using a clock signal, the clock signal being de-activated by the mask clock signal during an initial driving of the spindle motor.

BRIEF DESCRIPTION OF THE DRAWINGS

These and/or other features and advantages of the present general inventive concept will become apparent and more readily appreciated from the following description of the exemplary embodiments, taken in conjunction with the accompanying drawings in which.

DETAILED DESCRIPTION OF THE EMBODIMENTS

Figure 1:
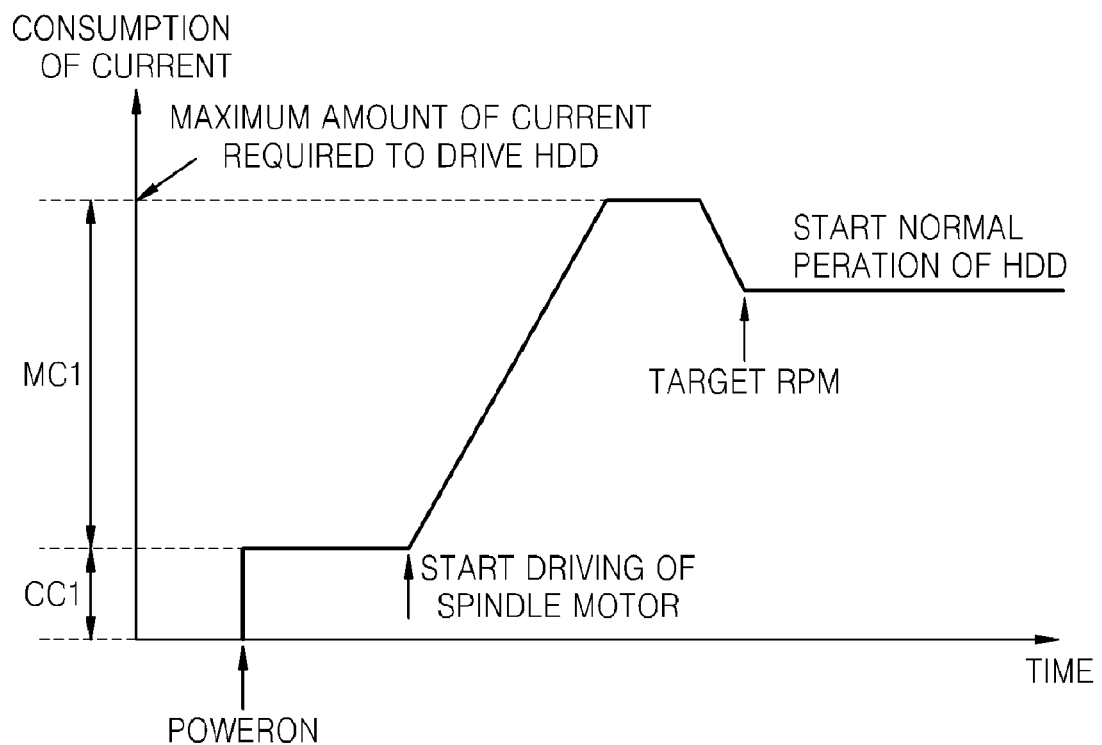
FIG. 1 is a graph for explaining current consumption with respect to an operating time of a hard disk drive.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

According to the present general inventive concept, the maximum amount of current supplied to a spindle motor is reduced by de-activating a clock signal or functional blocks operating in response to the clock signal prior to driving the spindle motor. Accordingly, even if the amount of current supplied from a hard disk driving circuit is small, the rotation number of the spindle motor may be normalized.

Generally, in order to rotate the spindle motor at a desired rotation number, the amount of current supplied to the spindle motor needs to be maintained at a constant level. However, in order to rotate the spindle motor from a state where the spindle motor does not operate to a state where the spindle motor rotates at a desired rotation number, the current needs to be increasingly supplied to the spindle motor until a predetermined amount of current or more is supplied to the spindle motor, and then the amount of current is reduced.

That is, the amount of current is increasingly supplied from an original amount to the maximum amount, and then the amount of current is reduced so that an appropriate amount of current is maintained at a constant level. When the appropriate amount of current is supplied, the desired rotation number of the spindle motor is maintained at a constant number. When the maximum amount of current is supplied, the rotation number of the spindle is lower than the desired rotation number.

FIG. 1 is a graph for explaining current consumption with respect to an operating time of a hard disk drive.

Referring to FIG. 1, when power is initially supplied (POWER ON), an amount of current CC1 consumed by the hard disk drive is determined according to a current required for an initial operation of functional blocks included in the hard disk drive. Functional blocks may include the spindle motor, the swing arm, and other mechanical parts of the hard disk drive. The functional block may include a circuit unit to drive a disk and to control the disk to read or write data. When power is initially supplied, the hard disk driver performs an initialization operation. At this time, most of the power is used to generate a main clock (CLK) or initialize the functional blocks by using the main CLK.

After the power is initially supplied and the functional blocks are partially initialized, the spindle motor is driven (Start driving of SPINDLE-MOTOR). When a predetermined time elapses after a current is supplied to the spindle motor, the amount of current supplied to the spindle motor does not increase anymore. At this time, the total amount of current supplied to the spindle motor corresponds to a difference MC1 between the maximum amount of current and the minimum amount of current. When a predetermined time elapses after the maximum amount of current is supplied to the spindle motor, the current is reduced again. Then, when the spindle motor is rotated at a desired rotation number, the current is maintained at a predetermined amount.

As described above, since the amount of current required by the spindle motor is determined according to the difference MC1 between an amount of current that initially flows through the spindle motor and the maximum amount of current, if the amount of current that initially flows through the spindle motor is reduced, the maximum amount of current may also be reduced. Thus, since the amount of current to be supplied from a power supply source of the hard disk drive is reduced, even if a lower amount of current than the prior minimum amount of current is supplied, the spindle motor may be sufficiently driven.

Figure 2:
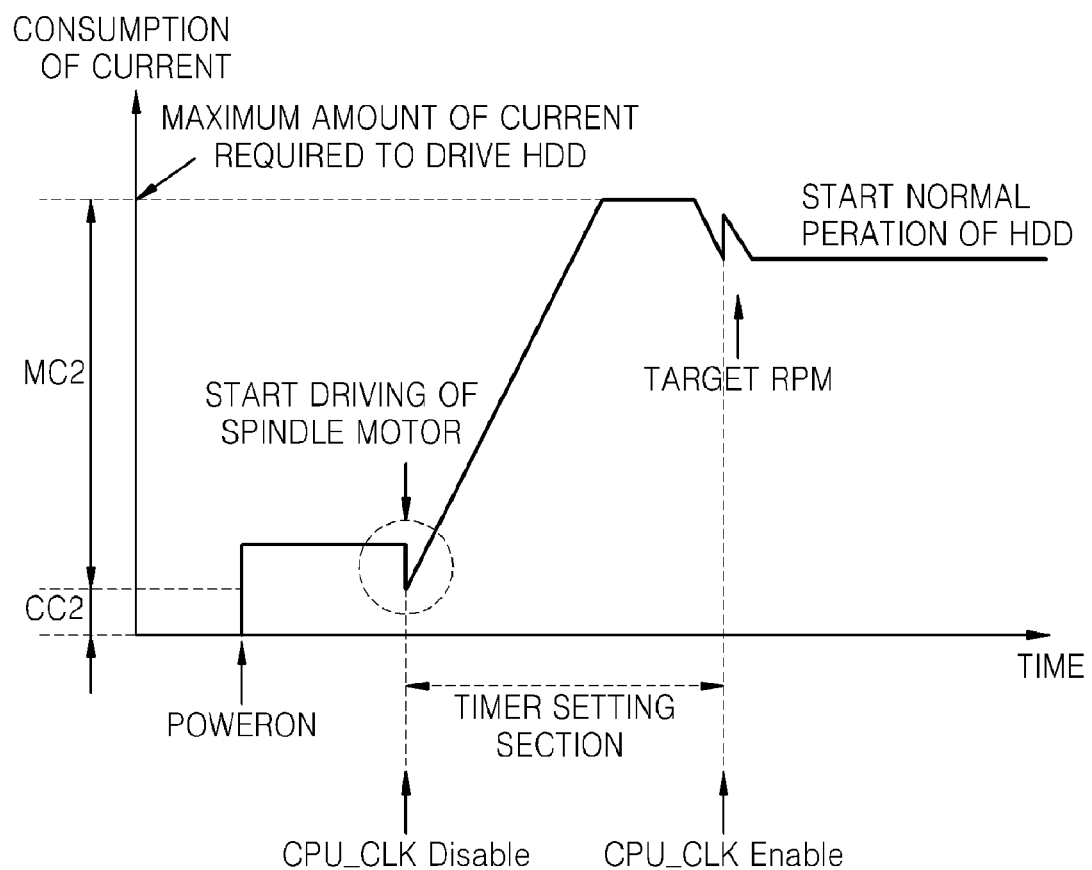
FIG. 2 is a graph for explaining current consumption with respect to an operating time of a hard disk drive, according to an exemplary embodiment of the present general inventive concept.

FIG. 2 is a graph for explaining current consumption with respect to an operating time of a hard disk drive, according to an exemplary embodiment of the present general inventive concept.

Referring to FIG. 2, the amount CC2 of an initial current supplied to the spindle motor is reduced (dotted line circle) by stopping an operation of a main CLK or stopping a functional block by using the main CLK prior to driving a spindle motor (CPU_CLK Disable). In FIG. 2, the amount CC2 of the initial amount of current supplied to the spindle motor is reduced compared to the case of FIG. 1. However, comparing FIGS. 1 and 2 in terms of the differences between the initial amount of current supplied to the spindle motor and the maximum amount of current, the difference MC1 of FIG. 1 is the same as the difference MC2 of FIG. 2.

FIG. 1 is the same as FIG. 2 except for the above difference.

Figure 3:
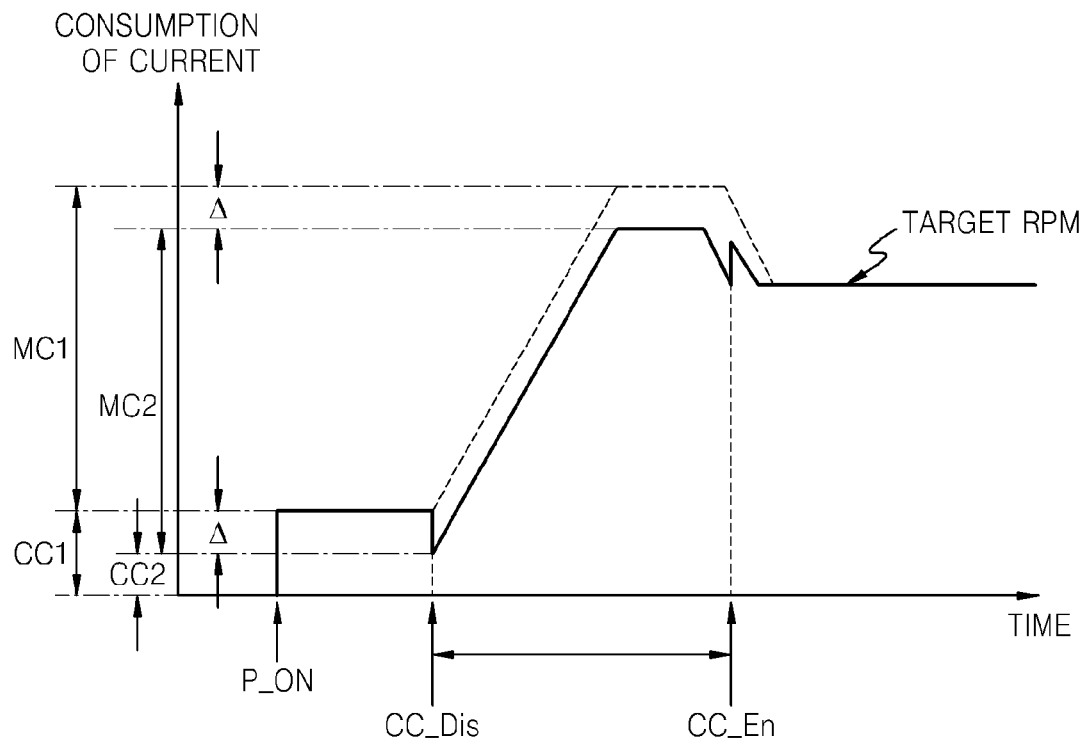
FIG. 3 is a graph of the combination of FIGS. 1 and 2.

FIG. 3 is a graph for explaining current consumption shown in FIGS. 1 and 2.

Referring to FIG. 3, the initial amount of current supplied to the spindle motor is reduced by delta ($\Delta$), and thus the maximum amount of current is reduced by delta ($\Delta$). Accordingly, it can be seen that the difference amounts MC1 and MC2 between the initial amount of current supplied to the spindle motor and the maximum amount of current are identical.

Figure 4:
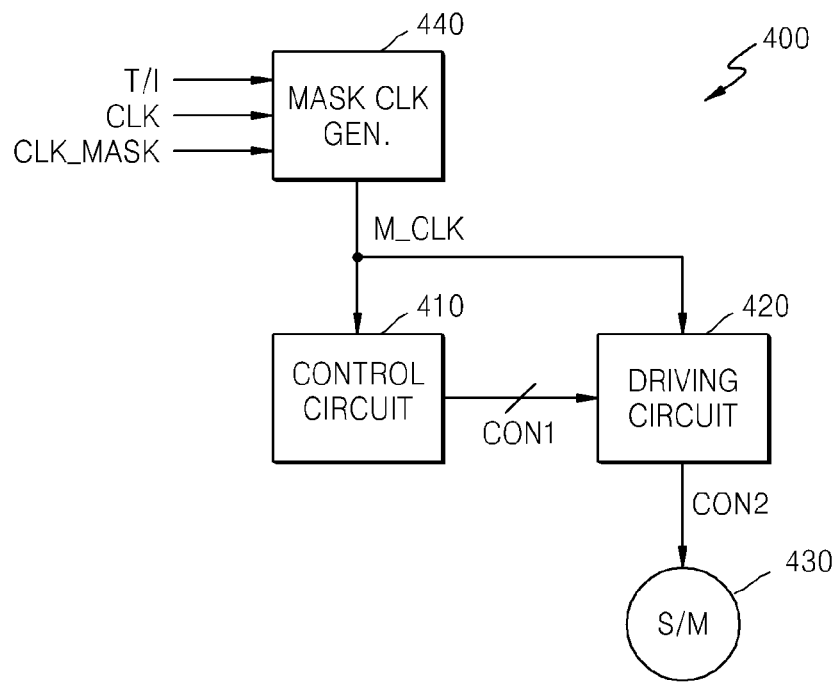
FIG. 4 is a block diagram of a hard disk driving circuit according to an exemplary embodiment of the present general inventive concept.

FIG. 4 is a block diagram of a hard disk driving circuit 400 according to an exemplary embodiment of the present general inventive concept. Referring to FIG. 4, the hard disk driving circuit 400 includes a control circuit 410, a driving circuit 420, a spindle motor (S/M) 430 and a mask clock signal generator 440. Although not illustrated in FIG. 4, the hard disk driving circuit 400 further includes a plurality of functional blocks for driving a disk.

The driving circuit 420 drives the spindle motor 430 in response to a control signal CON1 output by the control circuit 410.

The mask clock signal generator 440 generates a mask clock signal M_CLK that is de-activated during a predetermined period of time when the spindle motor 430 is driven by using a clock signal CLK, in response to a mask signal CLK_MASK having information regarding a time interval when the clock signal CLK is de-activated. If necessary, the mask clock signal generator 440 may generate the mask clock signal M_CLK by further using a timer interrupt signal T/I that re-activates the clock signal CLK.

The timer interrupt signal T/I may be activated before an amount of current supplied to the spindle motor 430 reaches a value required for a normal operation of the spindle motor 430, after a predetermined time elapses, and after the amount of current supplied to the spindle motor 430 reaches the maximum amount required for an operation of the spindle motor 430.

The control circuit 410, the driving circuit 420 and/or a plurality of functional blocks (not shown) may operate in response to the mask clock signal M_CLK output by the mask clock signal generator 440.

Figure 5:
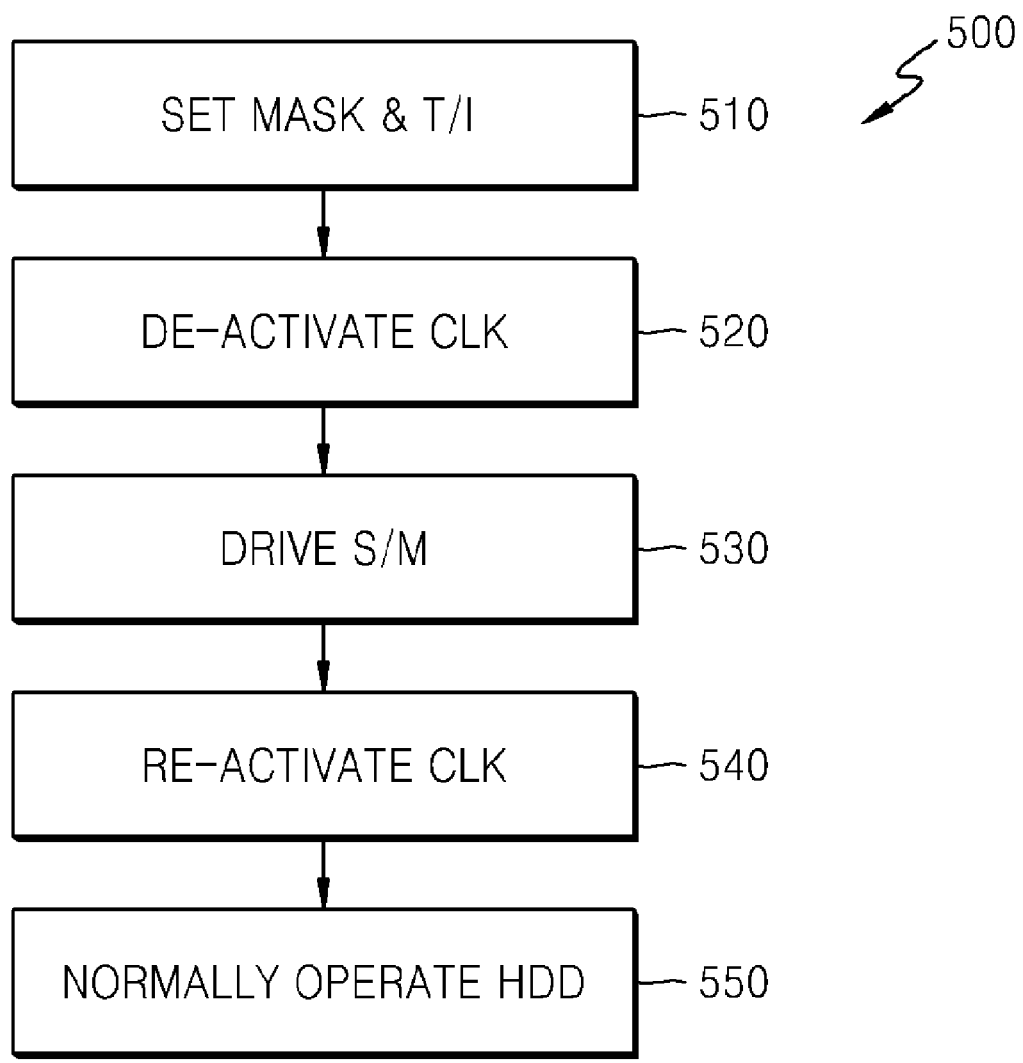
FIG. 5 is a flowchart illustrating the spindle motor driving method according to an exemplary embodiment of the present general inventive concept.

FIG. 5 is a flow chart of a spindle motor driving method 500 according to an exemplary embodiment of the present general inventive concept.

Referring to FIG. 5, the spindle motor driving method 500 is a method of driving a spindle motor that is used in a hard disk driving circuit including the spindle motor 430, the driving circuit 420 driving the spindle motor 430, the control circuit 410 controlling the driving circuit 420, and the plurality of functional blocks related to driving a hard disk, which are illustrated in FIG. 4.

The spindle motor driving method 500 includes setting a mask scope MASK and a timer interrupt signal T/I (operation 510), de-activating a mask clock signal M_CLK (operation 520), driving a spindle motor (operation 530), and re-activating the mask clock signal M_CLK (operation 540).

The mask scope MASK includes information regarding a period of time when the mask clock signal M_CLK is activated or de-activated. The timer interrupt signal T/I includes information for activating the mask clock signal M_CLK. The timer interrupt signal T/I activates the mask clock signal M_CLK before an amount of current applied to the spindle motor 430 reaches an amount required for a normal operation, i.e., the spindle motor rotating at a desired rotation number, of the spindle motor 430, and then a predetermined time elapses after the amount of current applied to the spindle motor 430 reaches the maximum amount required for proper operation of the spindle motor 430.

Figure 6:
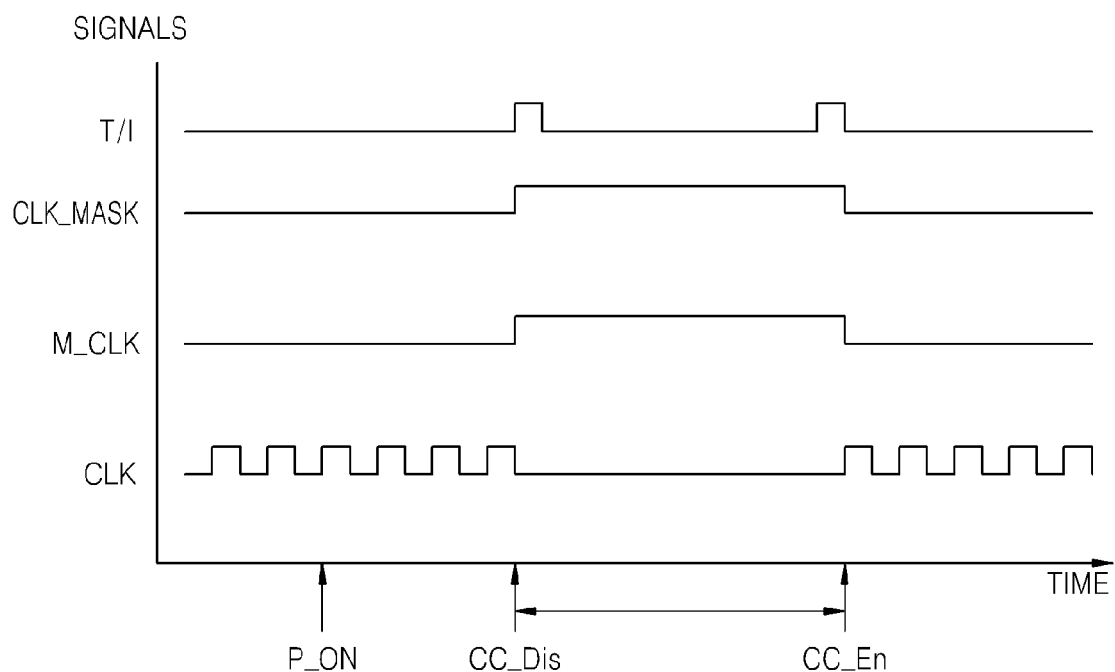
FIG. 6 is a timing chart illustrating the timing of the clock signal controlling the spindle motor driving method according to an exemplary embodiment of the present general inventive concept.

FIG. 6 is a timing chart illustrating the timing of the clock signal controlling the spindle motor driving method according to an exemplary embodiment of the present general inventive concept.

Referring to FIG. 6, the timer interrupt signal T/I, the mask signal CLK_MASK, the mask clock signal M_CLK, and the clock signal CLK are shown. The timing of the signals corresponding to power on (P_ON), clock disable (CC_Dis) and clock enable (CC_En) is shown. The timer interrupt signal T/I can be used before and/or after clock disable (CC_Dis) and clock enable (CC_En) to control the mask signal CLK_MASK and the mask clock signal M_CLK, which in turn control the clock signal CLK. The mask signal CLK_MASK and/or the mask clock signal M_CLK disable the clock signal CLK between clock disable (CC_Dis) and clock enable (CC_En).

Although a few embodiments of the present invention have been shown and described, it would be appreciated by those skilled in the art that changes may be made in these embodiments without departing from the principles and spirit of the general inventive concept, the scope of which is defined in the claims and their equivalents.

What is claimed is:

1. A hard disk driving circuit comprising:
   a spindle motor driving circuit to drive a spindle motor;
   a control circuit to control the spindle motor driving circuit;
   a plurality of functional blocks related to driving a hard disk; and
   a mask clock signal generator to generate a mask clock signal M CLK that is de-activated for a period of time when the spindle motor is driven, by using the clock signal CLK,
   wherein at least one selected from the group consisting of the control circuit, the spindle motor driving circuit, and the plurality of functional blocks operates according to the mask clock signal M CLK.

2. The hard disk driving circuit of claim 1, wherein the mask clock signal generator generates the mask clock signal M CLK according to a mask signal having information regarding a time interval at which the clock signal CLK is de-activated.

3. The hard disk driving circuit of claim 2, wherein the mask clock signal generator generates the mask clock signal M CLK by further using a timer interrupt signal for activating the clock signal CLK.

4. The hard disk driving circuit of claim 3, wherein the timer interrupt signal is activated before a current applied to the spindle motor reaches an amount of current required for a normal operation of the spindle motor and when a predetermined time elapses after the current applied to the spindle motor reaches the maximum amount of current for operating the spindle motor.

5. A method of driving a spindle motor of a hard disk driving circuit comprising a spindle motor, a spindle motor driving circuit driving the spindle motor, a control circuit controlling the spindle motor driving circuit, and a plurality of functional blocks related to driving a hard disk, the method comprising:
   de-activating a mask clock signal M CLK;
   driving the spindle motor after de-activating the mask clock signal M CLK; and
   re-activating the de-activated mask clock signal M CLK,
   wherein at least one selected from the group consisting of the control circuit, the spindle motor driving circuit, and the plurality of functional blocks operates in response to the mask clock signal M CLK.

6. The method of claim 5, further comprising setting a mask signal CLK MASK including information regarding a time interval at which the mask clock signal M CLK is activated or inactivated,
   wherein the time interval at which the mask clock signal M CLK is re-activated or de-activated is determined according to the mask signal CLK MASK.

7. The method of claim 6, wherein a period of time when the mask clock signal M CLK is re-activated or de-activated is determined by the mask signal CLK MASK and a timer interrupt signal for re-activating the mask clock signal M CLK to be activated.

8. The method of claim 7, wherein the timer interrupt signal is activated before a current applied to the spindle motor reaches a current amount required for a normal operation of the spindle motor and when a predetermined time elapses after the amount of current applied to the spindle motor reaches the maximum amount of current consumed for operating the spindle motor.

9. A method of driving a spindle motor of a hard disk driving circuit comprising a spindle motor, a spindle motor driving circuit driving the spindle motor, a control circuit controlling the spindle motor driving circuit, and a plurality of functional blocks related to driving a hard disk, the method comprising:
   prior to driving the spindle motor, de-activating functional blocks except for functional blocks used to drive the spindle motor.

10. The method of claim 9, wherein a main clock signal activates functional blocks that are de-activated before an amount of current applied to the spindle motor reaches an amount of current required for a normal operation of the spindle motor and when a predetermined time elapses after the current applied to the spindle motor reaches the maximum amount of current consumed for operating the spindle motor.

11. A method of driving a hard disk drive, the method comprising:
   de-activating a clock signal CLK used by a controller;
   starting a spindle motor controlled by the controller to drive a disk after the deactivation of the clock signal CLK; and
   upon full rotation of the spindle motor, re-activating the clock signal CLK,
   wherein the clock signal CLK is de-activated for a predetermined time by a mask clock signal M CLK.

12. The method of claim 11, further comprising setting the mask clock signal M CLK including information regarding the predetermined time at which the clock signal CLK is re-activated or de-activated.

13. The method of claim 11, wherein the predetermined time at which the clock signal CLK is re-activated or de-activated is determined by a timer interrupt signal to re-activate the clock signal CLK to be activated.

14. A hard disk drive comprising:
a spindle motor to drive a hard disk;
a mask clock signal generator to generate a mask clock signal M CLK; and
a controller to control a current to the spindle motor, the controller using a clock signal CLK, the clock signal CLK being de-activated by the mask clock signal M CLK during an initial driving of the spindle motor.

15. The hard disk drive of claim 14, wherein the mask clock signal generator generates the mask clock signal M CLK according to a mask signal having information regarding a time interval during which the clock signal CLK is de-activated.

16. A method of driving a motor, the method comprising:
activating a mask signal in response to a first timer interrupt signal;
activating a mask clock signal M_CLK in response to the activated mask signal;
de-activating a clock signal CLK according to the activated mask clock signal M_CLK that is received by a controller; and
starting a spindle motor controlled by the controller after the deactivation of the clock signal CLK.

17. The method of claim 16, comprising:
de-activating the activated mask signal CLK_MASK in response to a second timer interrupt signal when a current applied to the motor reaches a maximum amount of current for operating the motor;
de-activating the activated mask clock signal M_CLK in response to the de-activation of the activated mask signal CLK_MASK; and
activating the clock signal CLK in response to the de-activation of the activated mask clock signal M_CLK.

18. The method of claim 16, wherein a duration of the activated mask signal CLK_MASK is the same as a duration of the activated mask clock signal M_CLK.

19. The method of claim 18, wherein an amount of current consumed for operating the motor increases during the duration of the activated mask signal CLK_MASK until a maximum amount of current for operating the motor is reached.

20. The method of claim 18, wherein the amount of current consumed for operating the motor decreases at a point when the clock signal CLK is deactivated.

* * * * *